(12) United States Patent
Zhang et al.

(10) Patent No.: US 10,236,664 B2
(45) Date of Patent: Mar. 19, 2019

(54) FEED THRU MAIN BREAKER APPARATUS, SYSTEMS AND METHODS

(71) Applicant: Siemens Industry, Inc., Alpharetta, GA (US)

(72) Inventors: Fan Zhang, Suwanee, GA (US); Arthur Kevin Shumate, Duluth, GA (US); Brian J. Rusch, Suwanee, GA (US); Carey D. Harnois, Grayson, GA (US); Gustavo Cortes Rico, Suwanee, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 19 days.

(21) Appl. No.: 14/827,750

(22) Filed: Aug. 17, 2015

(65) Prior Publication Data

US 2017/0054276 A1    Feb. 23, 2017

(51) Int. Cl.
*H02B 1/20* (2006.01)
*H02B 1/21* (2006.01)
*H02B 1/30* (2006.01)
*H02B 1/32* (2006.01)

(52) U.S. Cl.
CPC ............... *H02B 1/30* (2013.01); *H02B 1/20* (2013.01); *H02B 1/21* (2013.01); *H02B 1/305* (2013.01); *H02B 1/32* (2013.01)

(58) Field of Classification Search
CPC . H02B 1/30; H02B 1/32; H02B 1/305; H02B 1/20; H02B 1/21
See application file for complete search history.

(56) References Cited

U.S. PATENT DOCUMENTS

| 4,031,433 | A | * | 6/1977 | Olashaw | H02B 1/21 174/99 B |
|---|---|---|---|---|---|
| 5,068,763 | A | * | 11/1991 | Brown | H02G 5/06 174/68.2 |
| 5,124,881 | A | * | 6/1992 | Motoki | H02B 13/02 361/605 |
| 5,196,987 | A | * | 3/1993 | Webber | H01R 25/16 361/624 |

(Continued)

OTHER PUBLICATIONS

Siemens: Power Mod & Uni-PAK. Multi-Family Metering Solutions. Norcross, Georgia. 2013. www.usa.siemens.com/powermod; Siemens Industry, Inc. (76 pages).

(Continued)

*Primary Examiner* — David M Sinclair
*Assistant Examiner* — Theron S Milliser

(57) ABSTRACT

A main breaker apparatus including feed thru bus and cross bus capability for multi-unit buildings. The main breaker apparatus includes an enclosure and a bus assembly within the enclosure. The bus assembly includes a feed thru bus assembly including a plurality of feed thru bus bars configured to receive line power at a first end and pass thru power at a second end, a cross bus assembly including a plurality of cross bus bars, and a main circuit interface device coupled between the plurality of feed thru bus bars and the plurality of cross bus bars. Electrical power distribution systems including the main breaker apparatus and methods of providing power to a multi-unit building are disclosed, as are other aspects.

19 Claims, 11 Drawing Sheets

(56) References Cited

U.S. PATENT DOCUMENTS

| | | | | |
|---|---|---|---|---|
| 5,515,236 A * | 5/1996 | Nolan | | H02B 1/21 174/68.2 |
| 5,854,445 A * | 12/1998 | Graham | | H02G 5/007 174/133 B |
| 6,205,019 B1 * | 3/2001 | Krom | | H02B 1/20 174/16.2 |
| 6,399,882 B1 * | 6/2002 | Faulkner | | E05D 7/1066 174/101 |
| 6,549,428 B1 * | 4/2003 | Fontana | | H02B 1/20 174/71 B |
| 6,603,075 B1 * | 8/2003 | Soares | | H02B 1/21 174/149 B |
| 7,091,417 B1 * | 8/2006 | Jur | | H02B 1/21 174/149 B |
| 7,121,856 B2 * | 10/2006 | Fontana | | H02B 1/21 439/212 |
| 7,367,830 B2 * | 5/2008 | Jur | | H02B 1/21 439/114 |
| 7,786,384 B2 * | 8/2010 | Diaz | | H02B 1/21 174/88 B |
| 8,305,739 B2 * | 11/2012 | Dozier | | H02B 1/056 174/50 |
| 8,730,651 B2 | 5/2014 | Cortes Rico | | |
| 9,124,077 B2 | 9/2015 | Robinson et al. | | |
| 9,397,457 B1 * | 7/2016 | Rodriguez Pedraza | | H01R 25/165 |
| 2005/0077072 A1 * | 4/2005 | Wiant | | H02B 1/21 174/68.2 |
| 2014/0098470 A1 | 4/2014 | Robinson | | |
| 2014/0211443 A1 * | 7/2014 | Pharne | | H02B 13/025 361/807 |

OTHER PUBLICATIONS

Meter Centers: Power Mod: Type WTB Standard Tapboxes; Siemens Industry, Inc. SPEEDFAX 2011 Product Catalog; Feb. 18, 2014 (10 pages).

* cited by examiner

FEED THRU MAIN BREAKER APPARATUS, SYSTEMS AND METHODS

FIELD

The present invention relates generally to apparatus, systems, and methods for electrical power distribution to units within multi-unit buildings.

BACKGROUND

Existing power distribution systems for multi-unit buildings generally include one or more stacks of meter sockets configured to receive utility meters, a main service breaker panel adapted to contain a main service circuit breaker, and a primary feed through tap box configured to pass power to other floors or areas of the building. Another floor or area of the multi-unit building may then include another feed through tap box receiving power from the primary feed through tap box, another main breaker panel, and one or more additional stacks of utility meters.

However, existing power distribution systems have difficulty in fitting within certain space constraints, thus there is a need for improvements to power distribution systems for multi-unit buildings.

SUMMARY

According to a first aspect, a main breaker apparatus is provided. The main breaker apparatus includes an enclosure having a back side, first side, a second side, a top and a bottom, and a bus assembly in the enclosure, the bus assembly including: a feed thru bus assembly including a plurality of feed thru bus bars configured to receive line power at a first end and pass thru power at a second end, a cross bus assembly including a plurality of cross bus bars extending between the first side and the second side, the enclosure configured to allow electrical connection to the plurality of cross bus through an opening in at least one of the first side and the second side, and a main circuit interface device coupled between the plurality of feed thru bus bars and the plurality of cross bus bars.

According to another aspect, an electrical power distribution system is provided. The electrical power distribution system includes a main service panel, a main breaker apparatus, comprising an enclosure having a back side, first side, a second side, a top and a bottom, and a bus assembly in the enclosure, the bus assembly including: a feed thru bus assembly including a plurality of feed thru bus bars, the plurality of feed thru bus bars receiving line power from the main service panel at a first end, a cross bus assembly including a plurality of cross bus bars extending between the first side and second sides, the enclosure configured to allow electrical connection to the plurality of cross bus through an opening in at least one of the first side and the second side, and a main circuit interface device coupled between the plurality of feed thru bus bars and the plurality of cross bus bars, a first meter stack abutting the first side of the enclosure, the first meter stack provided on a first floor or area of a building, the first meter stack coupled to the cross bus assembly through the opening, a second meter stack on a second floor or area of the building, the second meter stack receiving pass through power from the feed thru bus assembly at a second end.

According to yet another aspect, an improved method of distributing power in a multi-unit building is provided. The method of distributing power in a multi-unit building includes providing a first meter stack in a first area of a building, providing a second meter stack in another area of the building, providing a main breaker apparatus adjacent to the first meter stack, the main breaker apparatus comprising an enclosure and a bus assembly within the enclosure, the bus assembly including: a feed thru bus assembly including a plurality of feed thru bus bars, a cross bus assembly including a plurality of cross bus bars, and a main circuit interface device coupled between the plurality of feed thru bus bars and the plurality of cross bus bars, receiving line power to the plurality of feed thru bus bars, powering the first meter stack through an electrical connection to the plurality of cross bus bars, and providing power to the second meter stack through the plurality of feed thru bus bars.

Still other aspects, features, and advantages of the present invention may be readily apparent from the following description by illustrating a number of example embodiments and implementations, including the best mode contemplated for carrying out the present invention. The present invention may also be capable of other and different embodiments, and its details may be modified in various respects, all without departing from the substance and scope of the present invention. The invention covers all modifications, equivalents, and alternatives falling within the substance and scope of the invention.

BRIEF DESCRIPTION OF DRAWINGS

The drawings, described below, are for illustrative purposes only and are not necessarily drawn to scale. The drawings are not intended to limit the scope of the invention in any way. Wherever possible, the same or like reference numbers will be used throughout the drawings to refer to the same or like parts.

DESCRIPTION

Figure 1:
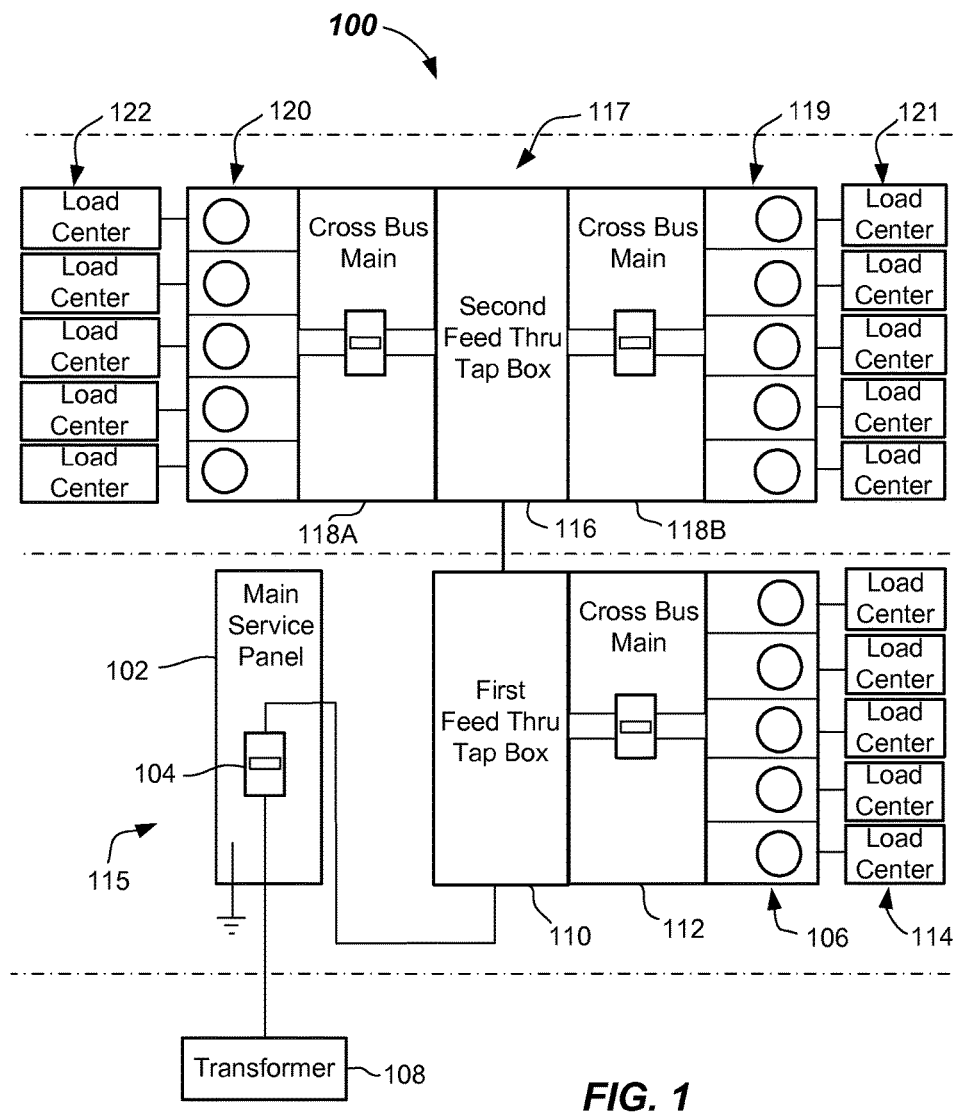
FIG. 1 illustrates a schematic view of an electrical power distribution system for a multi-unit building according to the prior art.

Reference will now be made in detail to the example embodiments of this disclosure, examples of which are illustrated in the accompanying drawings. Existing prior art electrical distribution systems 100 for providing electrical power distribution to multi-unit buildings involve, as shown in FIG. 1, include using a circuit breaker main service enclosure 102 for housing a main service circuit breaker 104, individual meter socket units that are housed in a first meter stack 106, and separate load centers 114, 121, 122 including circuit breakers for protected branch electrical circuits for each individual unit (e.g., apartment, condo, or office unit). The circuit breaker main service enclosure 102 receives power from a transformer 108, and feeds power to a feed through tap box 110. The feed through tap box provides 110, in turn, provides power to the cross bus main 112, which feeds power to the first meter stack 106. Each meter of the first meter stack 106 may measure utility usage of a load center 114 of one or more units of the multi-unit building. As shown, the prior art electrical distribution system 100 feeds power from the feed thru tap box 110 on a first floor or area 115 (denoted by lower and middle dotted lines) to a second feed through tap box 116 on a second floor or area 117 (denoted by upper and middle dotted lines). From second feed thru tap box 116, power may be directed to cross bus mains 118A, 118B on one or both sides of the second feed thru tap box 116. These, in turn, provide power to the meters stacks 119, 120. Load centers 121, 122 may be coupled to each of the meters in the meter stacks 119, 120, respectively. Such prior art power distribution systems 100 are generally complex and take up a large amount of space, which is already at a premium in such apartment, condo, and office buildings.

The aforementioned problems of prior art electrical power distribution systems 100 are overcome by one or more embodiments of the present invention. In particular, the use of the inventive main breaker apparatus not only reduces space envelope for the electrical power distribution system, but may also allow the use of fewer components. The inventive main breaker apparatus includes an enclosure, and a bus assembly contained in the enclosure. The bus assembly includes a feed thru bus assembly, a cross bus assembly, and a main circuit interface device. The enclosure may include a back side, first side, a second side, a top, and a bottom. The bus assembly includes the feed thru bus assembly, which includes a plurality of feed thru bus bars configured to receive line power at a first end (e.g., proximate to the bottom) and pass thru power to a second end (e.g., proximate to the top). The bus assembly further includes the cross bus assembly, which includes a plurality of cross bus bars extending between the first side and second sides, the enclosure being configured to allow electrical connection to the plurality of cross bus through an opening in at least one of the first side and the second side (or both). The main circuit interface device is electrically coupled between the plurality of feed thru bus bars and the plurality of cross bus bars.

One or more embodiments allow direct electrical connection between the main breaker apparatus and one or more meter stacks. Likewise, the main breaker apparatus may be coupled to another main breaker apparatus to allow feed thru of electrical power to another floor or area of a multi-unit building. Accordingly, the invention provides a compact electric power distribution system enabling compact electrical connections to meter stacks within various areas of the multiple unit buildings. One or more embodiments of the invention will be explained in greater detail with reference to FIGS. 2A-5 below.

Figure 4:
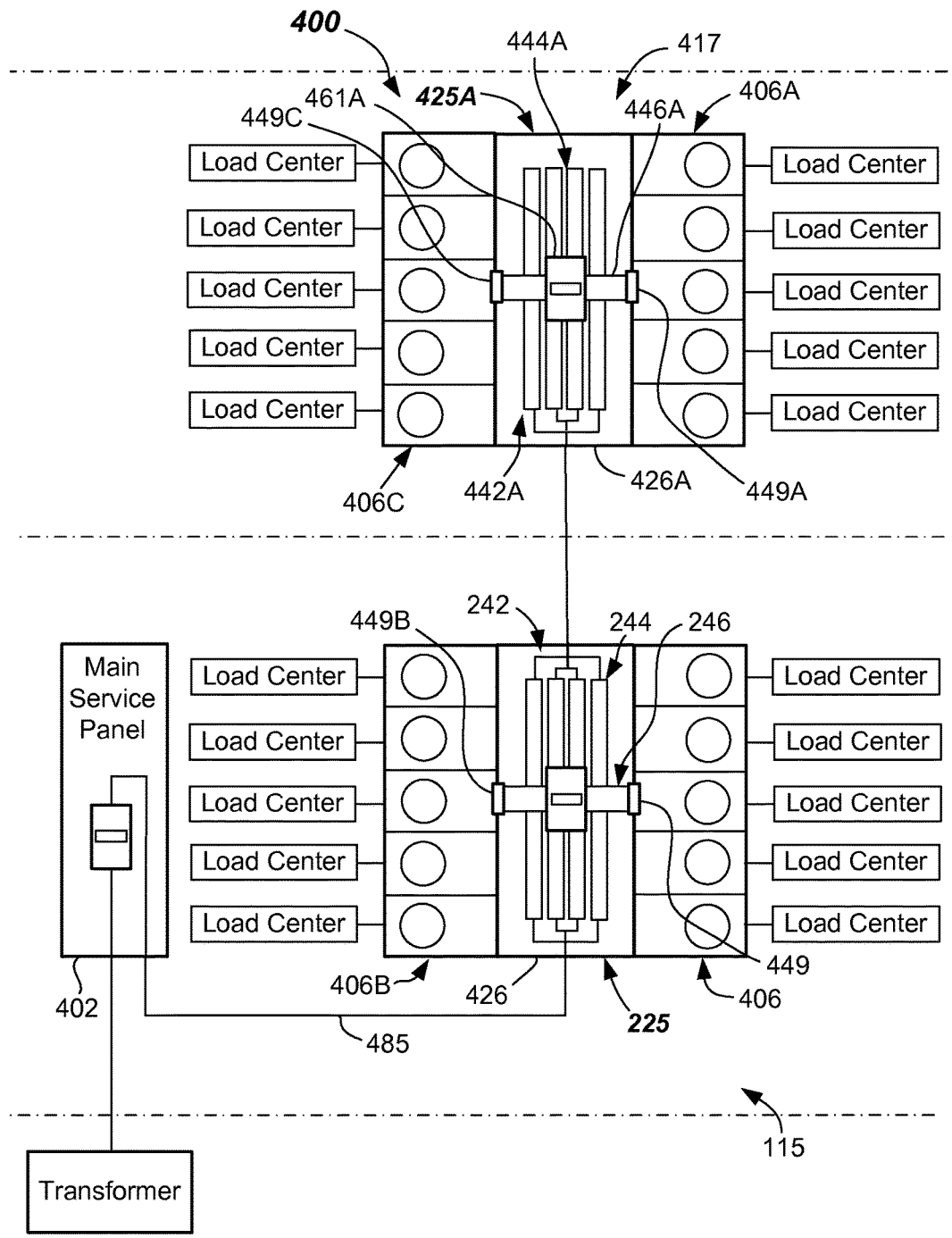
FIG. 4 illustrates a front schematic view of an electrical power distribution system including a main breaker apparatus according to one or more embodiments.

FIGS. 2A-2J illustrates one or more embodiments of a main breaker apparatus 225 that may be used within an electrical power distribution system 400 (shown in FIG. 4). The main breaker apparatus 225 may include an enclosure 226 (e.g., a metal box) that may include a back side 228, a first side 230 (e.g., left side), a second side 232 (e.g., right side), a top side 234, and a bottom side 236. One or more covers 238A, 238B may be included on a front side as part of the enclosure 226. Covers 238A, 238B may be removable and lockable. One of the covers (e.g., 238B) may include a breaker access door 240 adapted to allow access to a handle of a main breaker to be described fully below. The components of the enclosure 226 may be manufactured from bent rigid sheet material, such as sheet steel. Enclosure 226 may be mounted to a structure of a building in its use.

Figure 2A:
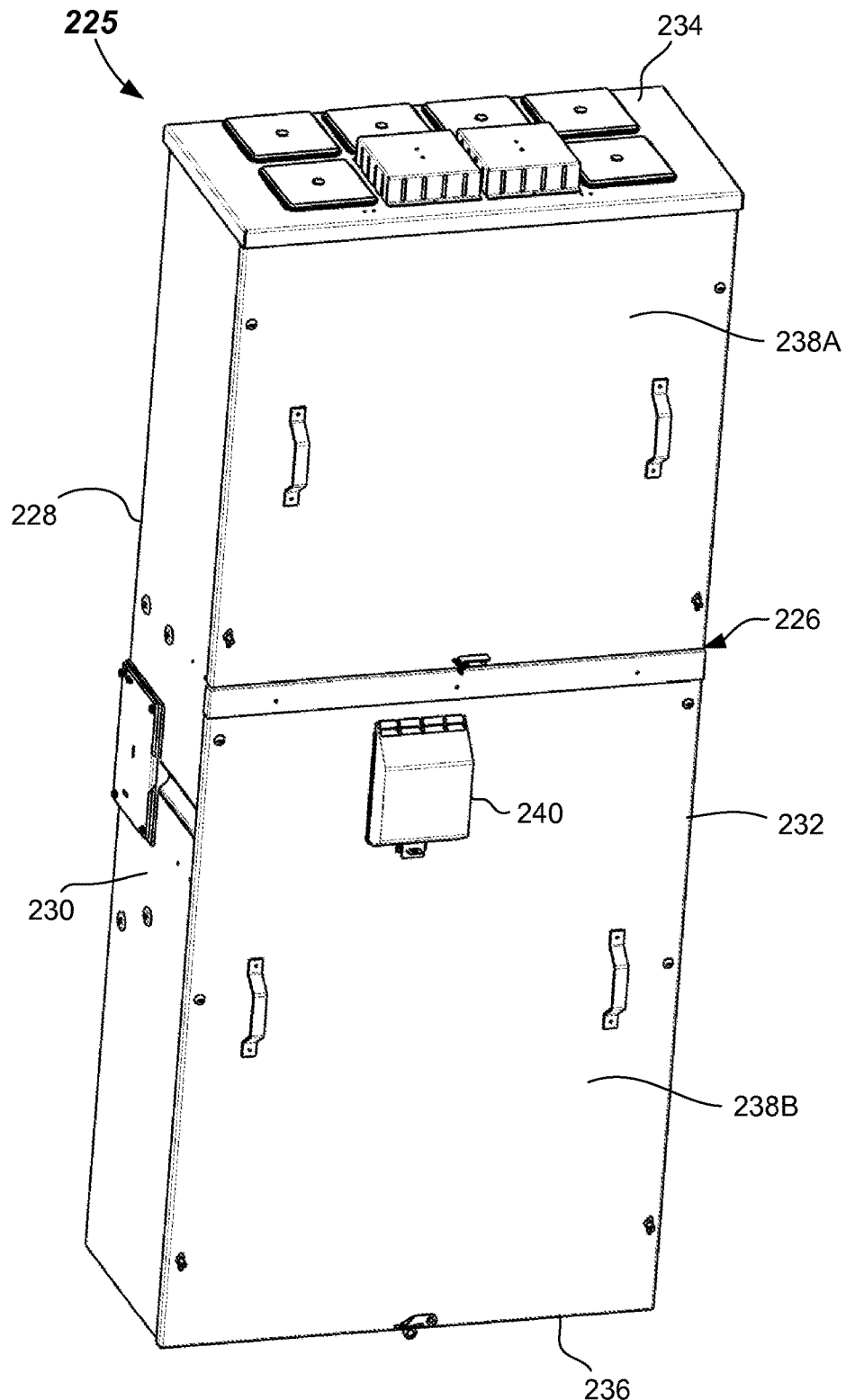
FIG. 2A illustrates a front isometric view of a main breaker apparatus according to one or more embodiments.
Figure 2B:
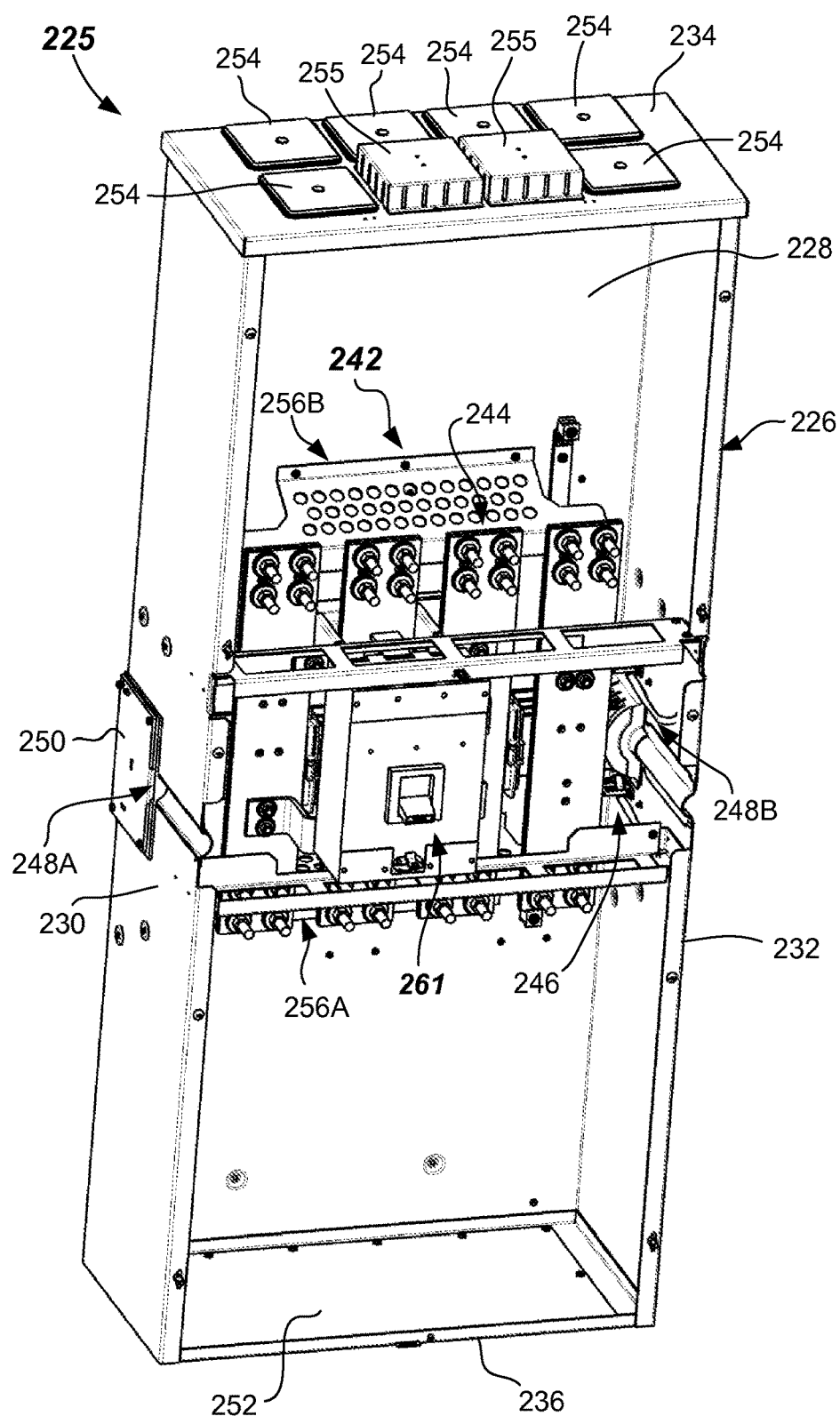
FIG. 2B illustrates a front isometric view of a main breaker apparatus with the front covers removed for illustration purposes according to one or more embodiments.
Figure 2C:
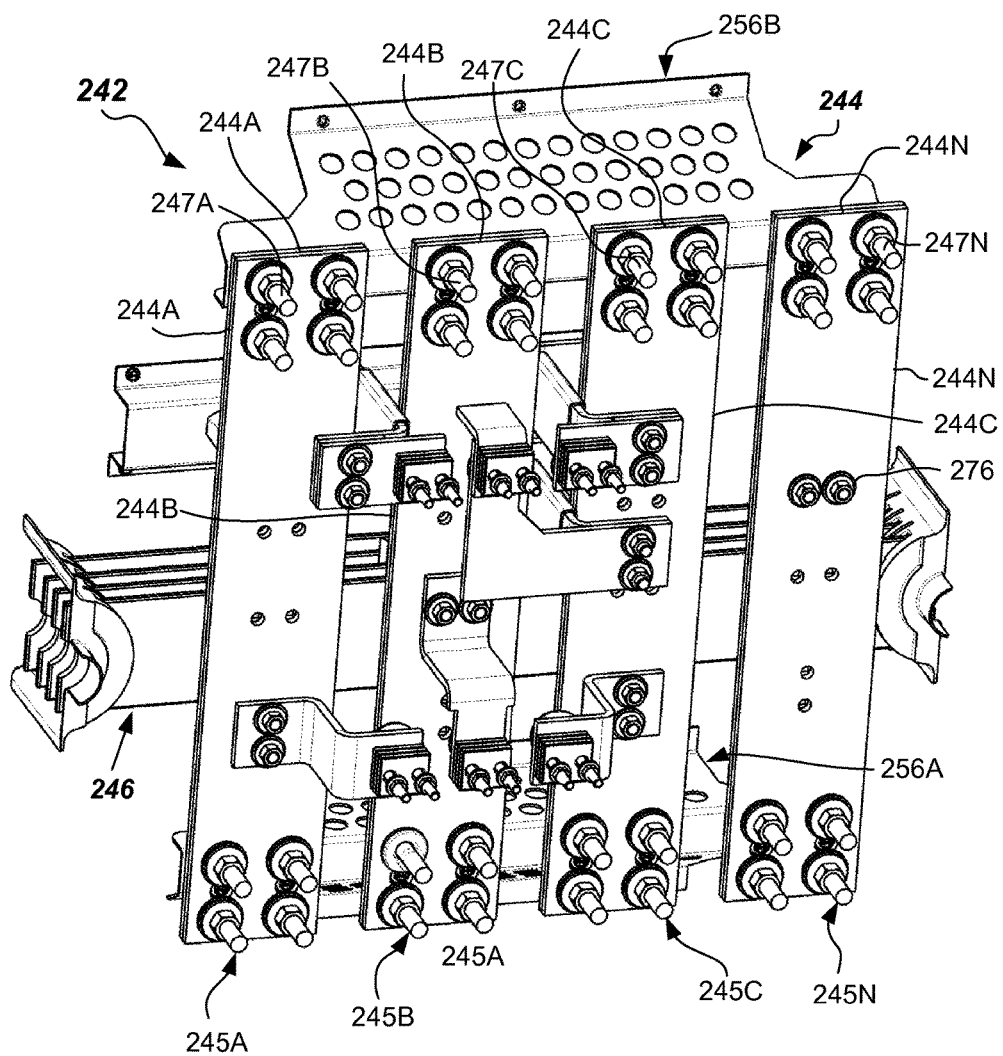
FIG. 2C illustrates a front isometric view of a bus assembly of a main breaker apparatus according to one or more embodiments.

Main breaker apparatus 225 may further include a bus assembly 242 that is contained within the enclosure 226 as best shown in FIGS. 2B and 2C. The bus assembly 242 includes a feed thru bus assembly 244 and a cross bus assembly 246 as best shown in FIG. 2O. Each of the feed thru bus assembly 244 and a cross bus assembly 246 may be mounted to the back side 228 of the enclosure 226 or elsewhere in the enclosure 226, such as by any suitable fasteners (e.g., bolts, screws, rivets, snap fit features, or the like).

In more detail, the feed thru bus assembly 244 includes a plurality of feed thru bus bars 244A-244C and 244N, representing A, B, and C phases and neutral, respectively. The plurality of feed thru bus bars 244A-244C and 244N may be arranged in a side-by-side orientation between the first side 230 and the second side 232 and each may extend from the bottom side 236 to the top side 234. The plurality of feed thru bus bars 244A-244C and 244N may be rectangular bars having a width of between about 34.5 in (89 mm) and 7 in (178 mm), a thickness of between about 0.25 in (6 mm) and 0.5 in (13 mm), and a length of between about 21 in (53 cm) and 24 in (61 cm). Other dimensions may be used. The feed thru bus bars 244A-244C and 244N may be an electrically conductive material, such as copper or aluminum.

The plurality of feed thru bus bars 244A-244C and 244N may extend vertically from the bottom side 236 to the top side 234 along the length of the enclosure 226, as shown in FIG. 2B. Each end of the feed thru bus bars 244A-244C and 244N may be constructed to include connectors, such as line connectors 245A-245N, and load connectors 247A-247N. The line connectors 245A-245N and load connectors 247A-247N may be threaded members and are configured to enable electrical connection of incoming and outgoing electrical wires to the feed thru bus bars 244A-244C and 244N. For example, as best shown in FIG. 2C, each end of each of the plurality of feed thru bus bars 244A-244C and 244N may include four wire connectors that may be adapted to accept NEMA connectors, such as two NEMA-2 connectors per end. Other types of NEMA connectors may be used, such as NEMA-1 or NEMA-4.

In some embodiments, the main breaker apparatus 225 may be configured to receive line power at a first end. First end may be proximate to the bottom side 236 and pass thru electrical current to a second end through the feed thru bus bars 244A-244C and 244N. The second end may be proximate to the top side 234. This can be reversed with line entry at the top side 234 and exit at the bottom side 236 in some embodiments. In the depicted embodiment, a cover plate 252 (FIG. 2B) may be provided at the bottom side 236. This allows the installer to cut the desired size and location of hole to receive the line side conductors and any conduit carrying the line side conductors, for example. Cover plate 252 may be removable from the bottom side 236 by removal of one or more screws.

In the depicted embodiment, a plurality of hub openings may be provided that may be closed by removable hub covers 254. For example, six removable hub covers 254 are shown. However, more or less numbers of removable hub covers 254 may be used. Removable hub covers 254 may be provided on the top side 234. This allows the installer to remove only the needed number of removable hub covers 254 to pass the power through to another floor or area of the building. Optionally, knockouts may be provided on the top side 234. One or more chimneys 255 may be provided on the top side 234 to remove heat from the enclosure 226.

The feed thru bus assembly 244 may include mounting features to securely mount the feed thru bus bars 244A-244C and 244N to the enclosure 226. Mounting features may comprise first and second thru mounting brackets 256A, 256B as shown in FIG. 2B-2D, FIGS. 2I and 2J. Each of the feed thru bus bars 244A-244C and 244N may be coupled to, and supported by, first and second thru mounting brackets 256A, 256B. As shown in FIGS. 2I and 2J, first and second thru mounting brackets 256A, 256B include support members 257A, 257B and insulating standoffs 258. The insulating standoffs 258 insulate the feed thru bus bars 244A-244C and 244N from the support members 257A, 257B, which may be bent metal. Insulating standoffs 258 may be made of an electrical insulating material such as a polypropylene material. Insulating standoffs 258 may be fastened to the first and second thru mounting brackets 256A, 256B by plastic fasteners, and to the feed thru bus bars 244A-244C and 244N by plastic fasteners. Support members 257A, 257B may each include ventilation holes to aid in heat flow to the chimneys 255. Each of the first and second thru mounting brackets 256A, 256B may be mounted to the back side 228 of the enclosure 226 by fasteners such as bolts, screws, snap fit features, or the like. First and second thru mounting brackets 256A, 256B space the feed thru bus bars 244A-244C and 244N from the back side by about 4.75 inch (120 mm).

Figure 2D:
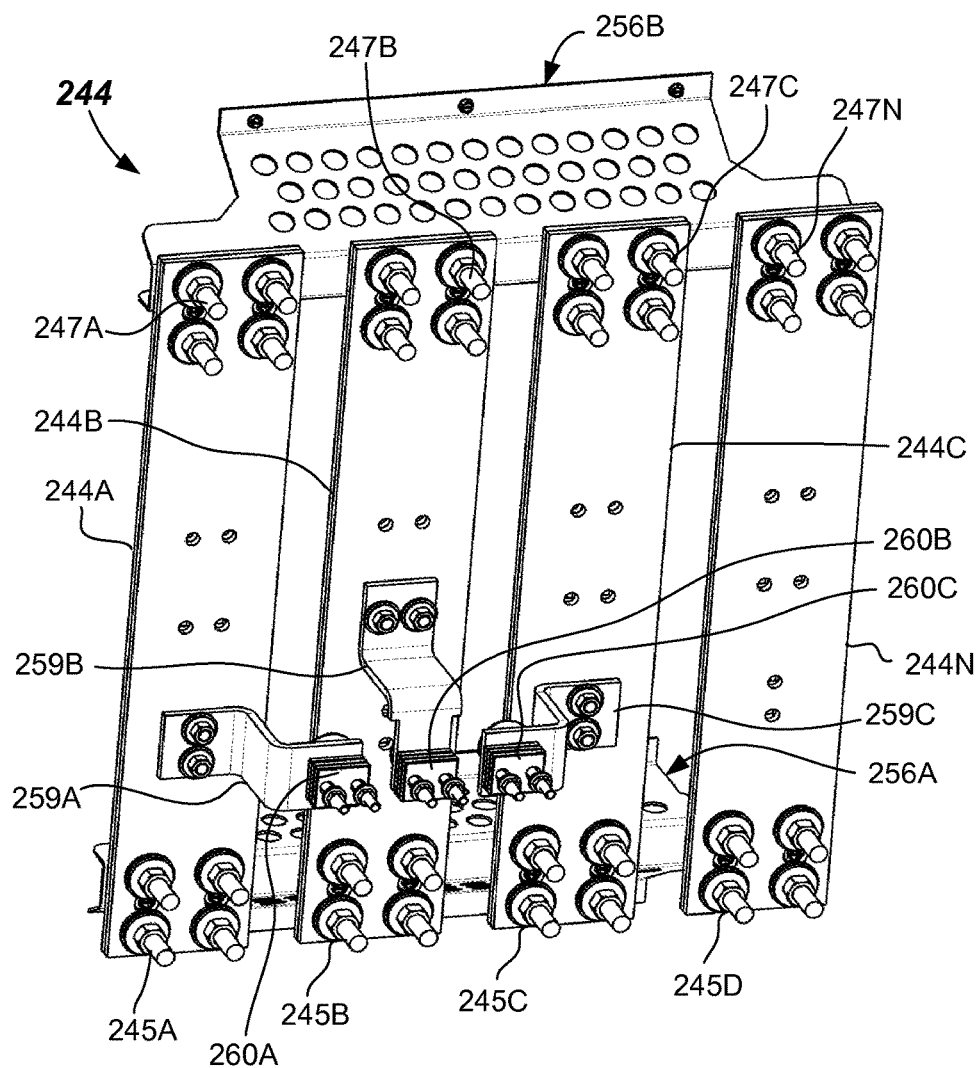
FIG. 2D illustrates a front isometric view of a feed thru bus assembly of a main breaker apparatus according to one or more embodiments.

Coupled to each of the feed thru bus bars 244A-244C are line side brackets 259A-259C, as is shown in FIG. 2D. Line side brackets 259A-259C couple to the feed thru bus bars 244A-244C on one end, such as by fasteners (e.g., screws, bolts, or the like) and include line side breaker mounts 260A-260C at the other end. Line side breaker mounts 260A-260C are configured to attach to the line side of a main circuit interface device 261 (FIG. 2B), for example. Thus, line side brackets 259A-259C provide an electrical connection between the feed thru bus bars 244A-244C and the line side of the main circuit interface device 261.

Figure 2E:
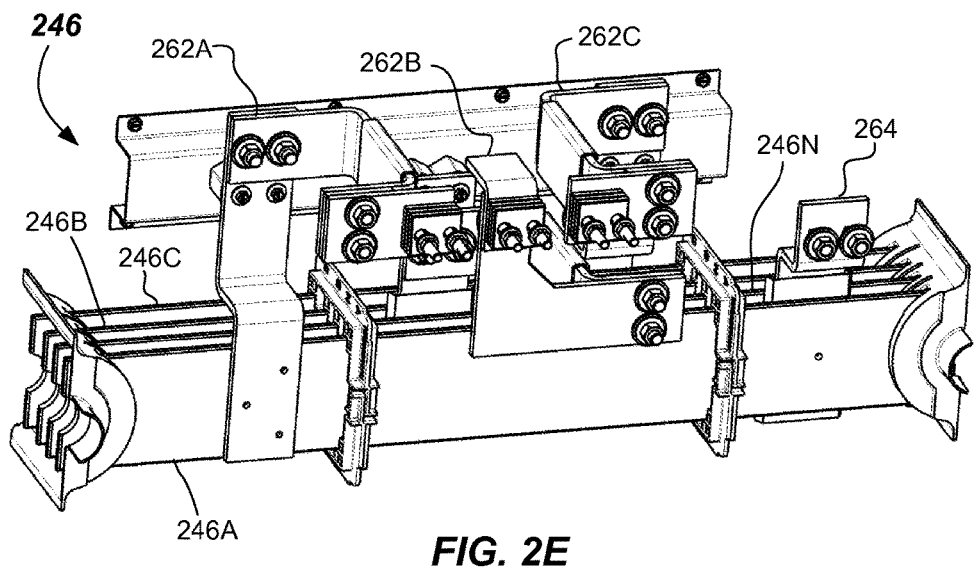
FIG. 2E illustrates a front isometric view of a cross bus assembly of a main breaker apparatus according to one or more embodiments.

The main breaker apparatus 225 also includes a cross bus assembly 246 as best shown in FIG. 2E. Cross bus assembly 246 may include a plurality of cross bus bars (labeled 246A, 246N, 246B, and 246C (labeled from front to back), which are configured and adapted as an A-phase bus, neutral bus, B-phase bus, and C-phase bus, respectively. The plurality of cross bus bars 246A-246C and 246N may extend laterally between the first side 230 and the second side 232 within the enclosure 226. Plurality of cross bus bars 246A-246C and 246N extend continuously between the first side 230 and the second side 232.

The enclosure 226 may include one or more openings 248A, 248B configured to allow electrical connection to the plurality of cross bus 246A-246C and 246N through the one or more of the openings 248A, 248B. For example, the cover 250 may be removed from at least one of the first side 230 and the second side 232, or both, to allow access for connector 449 and/or 449B for electrical connection to the ends of the plurality of cross bus 246A-246C and 246N through the one or more openings 248A, 248B. The connection to the plurality of cross bus 246A-246C and 246N may be made by any suitable connector 449A-449C, such as a QUICK CONNECT™ connector available from Siemens Corporation. Connection may be to a meter stack 406 (via connector 449) and/or a third meter stack 406B (via connector 449B), for example. In some embodiments, POWER MOD™ meter stacks available from Siemens Corporation may be coupled to the main breaker apparatus 225. The connection to the respective cross bus bars 246A-246C and 246N may be optionally as described in U.S. Pat. Nos. 3,104,276; 3,183,298; 3,909,098; and 5,466,889, the disclosures of which are hereby incorporated by reference herein in their entirety.

In more detail, cross bus assembly 246 includes load side brackets 262A-262C and neutral bracket 264 coupled to each of the plurality of cross bus 246A-246C and 246N. Each of the load side brackets 262A-262C are shown individually in FIGS. 2F-2H without the other brackets being shown for illustration purposes.

Figure 2F:
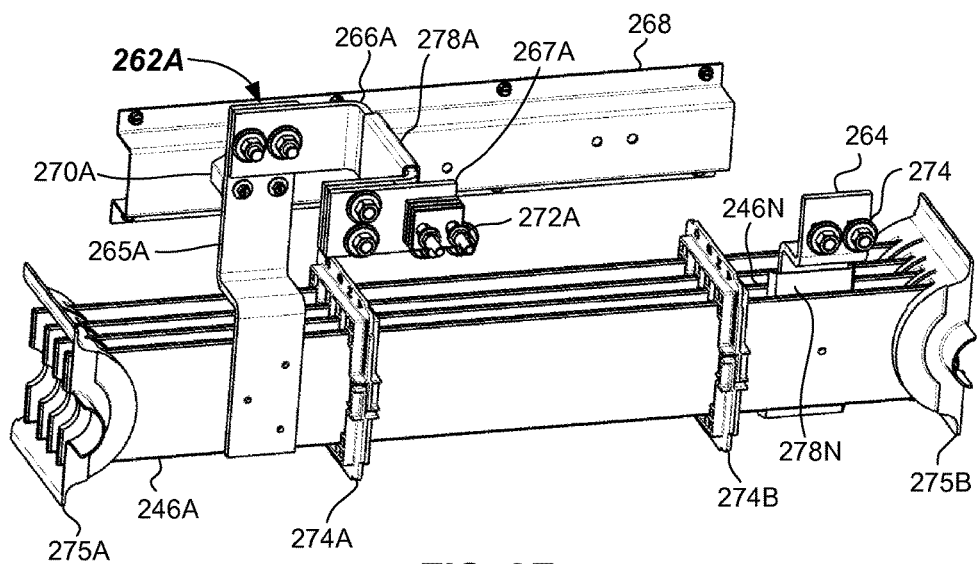
FIG. 2F illustrates a front isometric view of an A-phase bracket assembly of a cross bus assembly according to one or more embodiments.

FIG. 2F illustrates an A-phase load side bracket 262A. A-phase load side bracket 262A may include a first bracket portion 265A that couples to the A-phase cross bus 246A on one end, such as by braising or welding, and to an second bracket portion 266A on the other, such as by fastening with fasteners (screws, bolts, or the like). First bracket portion 265A may be coupled to a cross bus mounting bracket 268, which may be coupled to the back side 228 of the enclosure by screws, bolts, snap fit features or the like. Coupling between the cross bus mounting bracket 268 and the first bracket portion 265A may be accomplished by cross bus insulator standoffs 270A made of an insulating material such as a glass-filled thermoset plastic, for example. Other suitable insulating materials may be used. The second bracket portion 266A may be coupled to a third bracket portion 267A, such as by screws or bolts. Third bracket portion 267A may include load side breaker mount 272A configured to attach to the main circuit interface device 261. First bracket portion 265A, second bracket portion 266A, and third bracket portion 267A may be made of a conductive metal such as aluminum or copper. First bracket portion 265A, second bracket portion 266A, and third bracket portion 267A may be metal straps having a thickness of about 0.25 in (6 mm) and a width or about 2 in (50 mm) to about 3.5 in (89 mm), for example. Other sizes and conductive materials may be used. The plurality of cross bus 246A-246C and 246N may be separated from each other by insulating spacers 274A, 274B. Insulating cuffs 275A, 275B space the plurality of cross bus 246A-246C and 246N at the first and second ends. Also shown in FIG. 2F is the neutral bracket 264 that may be coupled between the neutral cross bus 246N and the neutral feed thru bus 244N (FIG. 2C) to electrically connect them. The second bracket portion 266A may include an insulator plate 278A thereon which serves to insulate between the A-Phase feed thru bus bar 244A and the B-Phase feed thru bus bar 244B (FIG. 2C). Likewise, the neutral bracket 264 may include an insulator plate 278N thereon, which serves to insulate between the A-Phase cross bus 246A and the neutral cross bus 246N.

Figure 2G:
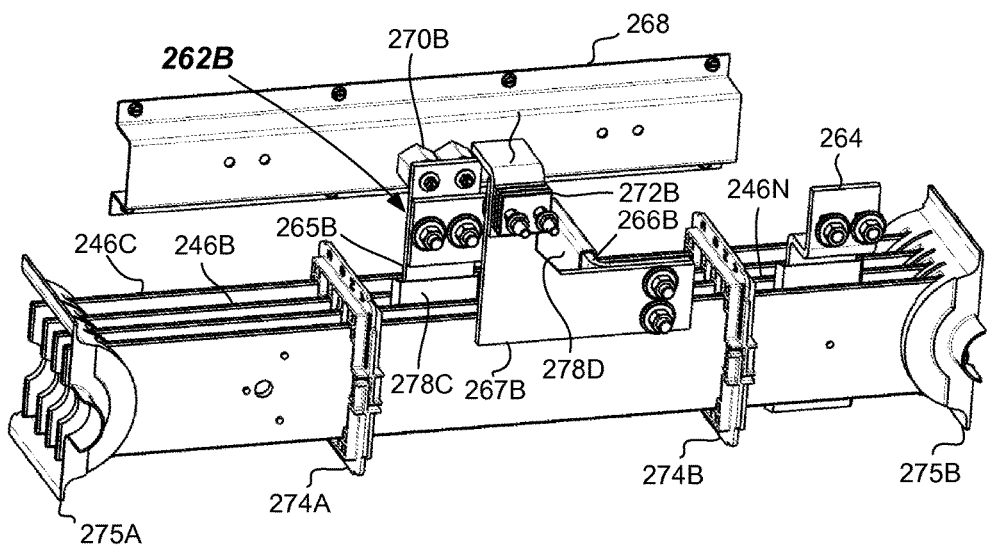
FIG. 2G illustrates a front isometric view of a B-phase bracket assembly of a cross bus assembly according to one or more embodiments.

FIG. 2G illustrates a B-phase load side bracket 262B. B-phase load side bracket 262B may include a first bracket portion 265B that couples to the B-phase cross bus 246B on one end, such as by braising or welding, and to a second bracket portion 266B on the other, such as by fastening with fasteners (screws, bolts, or the like). First bracket portion 265B may be coupled to the cross bus mounting bracket 268. Coupling between the cross bus mounting bracket 268 and the first bracket portion 265B may be accomplished by cross bus insulator standoffs 270B, made of an insulating material such as a glass-filled thermoset plastic, as before. The second bracket portion 266B may be coupled to a third bracket portion 267B, such as by screws, bolts, or the like. Third bracket portion 267B may include load side breaker mount 272B configured to attach to the main circuit interface device 261. First bracket portion 265B, second bracket portion 266B, and third bracket portion 267B may be made of the same conductive metals and have the same thickness and width as discussed above, for example. Other sizes and conductive materials may be used. Both the first bracket portion 265B and the second bracket portion 266B may include insulator plates 278C, 278D thereon, which serve to insulate between the neutral feed thru bus 244N and the B-Phase feed thru bus 244B and between the B-Phase feed thru bus 244B (FIG. 2C) and the C-phase feed thru bus 244C, respectively.

Figure 2H:
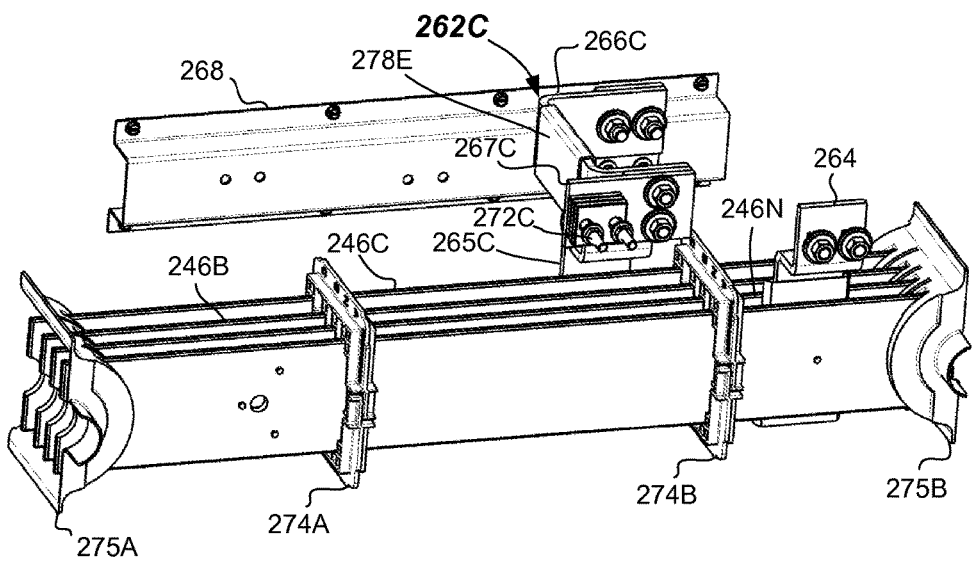
FIG. 2H illustrates a front isometric view of a C-phase bracket assembly of a cross bus assembly according to one or more embodiments.
Figure 2I:
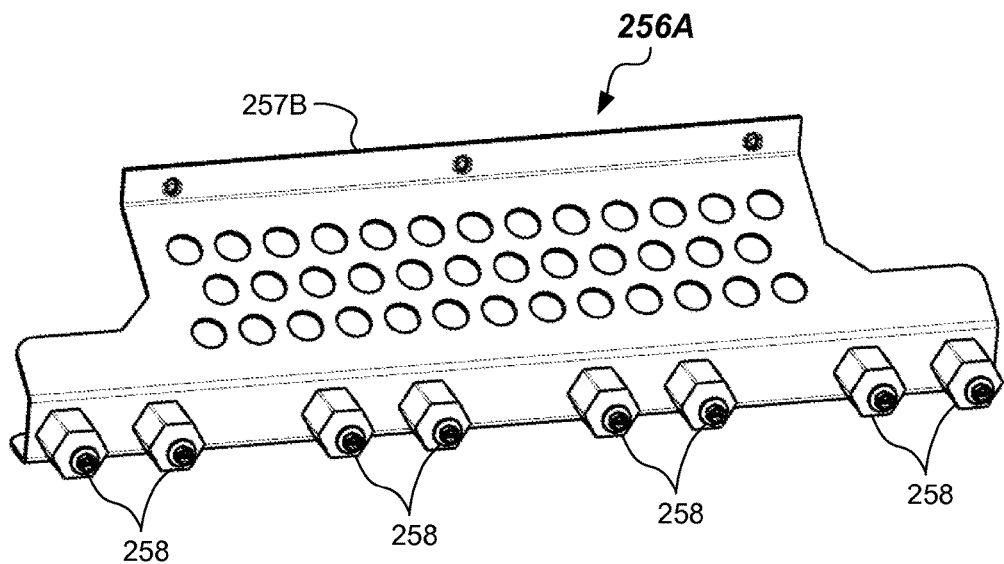
FIGS. 2I and 2J illustrate front isometric views of upper and lower support brackets, respectively, of a feed thru bus assembly according to one or more embodiments.
Figure 2J:
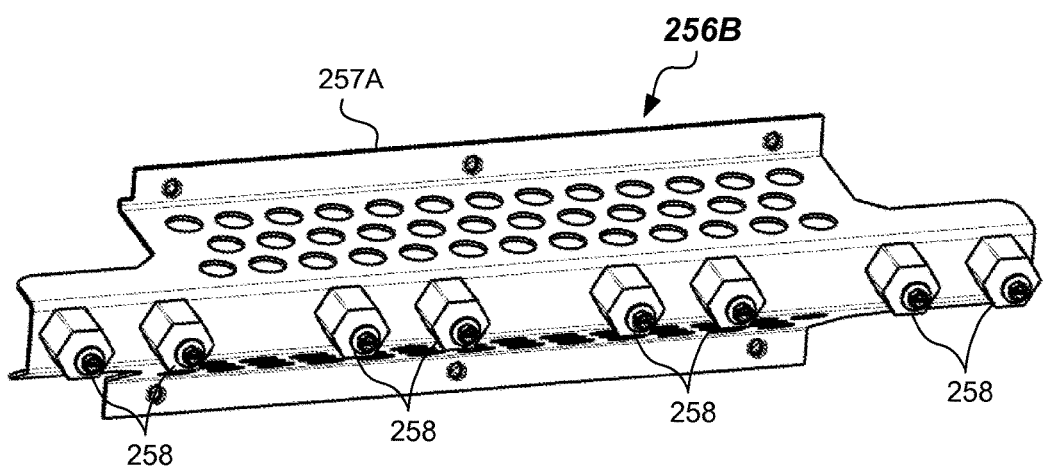

FIG. 2H illustrates a C-phase load side bracket 262C. C-phase load side bracket 262C may include a first bracket portion 265C that couples to the C-phase cross bus 246C on one end, such as by braising or welding, and to a second bracket portion 266C on the other, such as by fastening with fasteners (screws, bolts, or the like). First bracket portion 265C may be coupled to the cross bus mounting bracket 268. Coupling between the cross bus mounting bracket 268 and the first bracket portion 265C may be accomplished by cross bus insulator standoffs (hidden behind first bracket portion 265C), made of an electrically insulating material, such as such as a polypropylene material. The second bracket portion 266C may be coupled to a third bracket portion 267C, such as by screws, bolts, or the like. Third bracket portion 267C may include load side breaker mount 272C configured to attach to the main circuit interface device 261. First bracket portion 265C, second bracket portion 266C, and third bracket portion 267C may be made of the same conductive metals and have the same thickness and width as discussed above, for example. Other sizes and conductive materials may be used. The second bracket portion 266C may include an insulator plates 278E, thereon, which serves to insulate between the B-Phase feed thru bus 244B (FIG. 2C) and the C-phase feed thru bus 244C, respectively.

Figure 3:
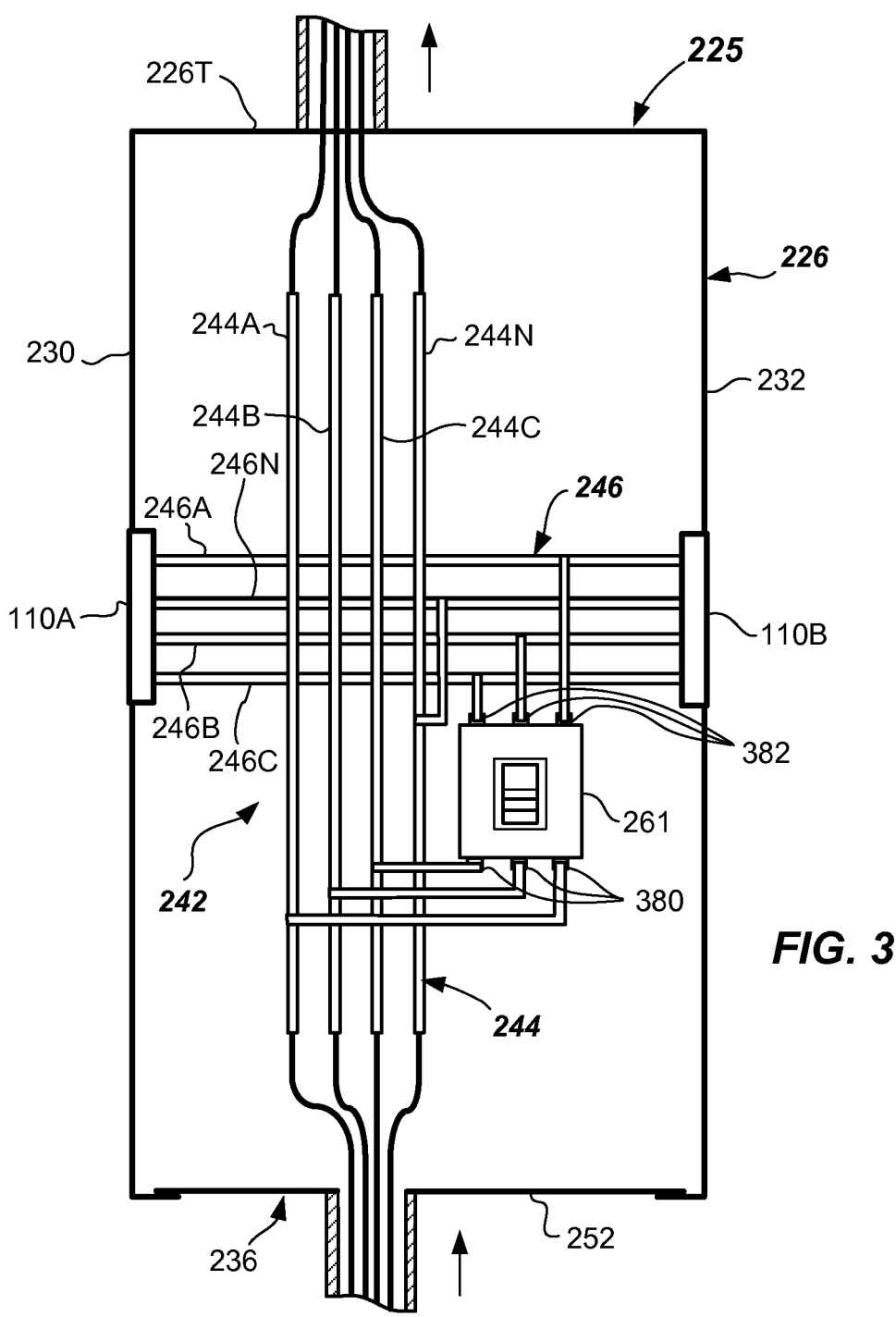
FIG. 3 illustrates a front schematic plan view of a main breaker apparatus including feed thru bus assembly and cross bus assembly according to one or more embodiments.

As best shown in FIG. 2B and in the schematic representation of FIG. 3, the main circuit interface device 261 is electrically coupled between the plurality of feed thru bus bars 244A-244C and the plurality of cross bus bars 246A-246C. The line side conductors 380 of the main circuit interface device 261 couple to the feed thru bus bars 244A-244C. Load side conductors 382 of the main circuit interface device 261 couple to the cross bus bars 246A-246C.

The main circuit interface device 261 may be a circuit breaker, an electrical switch, or the like. Main circuit interface device 261 is shown as a circuit breaker in FIG. 2B. Circuit breaker may have a handle rating of between about 200 A and about 1,200 A, for example.

FIG. 4 illustrates an example embodiment of an electrical power distribution system 400. Electrical power distribution system 400 includes a main service panel 402, a main breaker apparatus 225 including an enclosure 226 as described above, a bus assembly 242 within the enclosure 226, the bus assembly including a feed thru bus assembly 244 and a cross bus assembly 246. Electrical power distribution system 400 further includes a main circuit interface device 261 electrically coupled between the feed thru bus assembly 244 and the cross bus assembly 246, and specifically between the plurality of feed thru bus bars 444A-444C and the plurality of cross bus bars 446A-446C.

The plurality of feed thru bus bars 446A-446C are configured to receive line power from the main service panel 402 at a first end (e.g., proximate to the bottom side 236). The plurality of cross bus bars extend between the first side and second sides, wherein the enclosure is configured to allow electrical connection to the plurality of cross bus 246A-246C and 246N through an opening in at least one of the first side (e.g., first side 230) and the second side (e.g., second side 232).

Electrical power distribution system 400 further includes a first meter stack 406 abutting the first side (e.g., first side 230) of the enclosure 226, the first meter stack 406 provided on a first floor or area 415 of a building (designated between the lower and middle dotted lines), the first meter stack 406 being coupled to the cross bus assembly 246 through the opening 248. Electrical power distribution system 400 further includes a second meter stack 406A on a second floor or area 417 of the building (designated between the middle and upper dotted lines), wherein the second meter stack 406B receives pass through power from the feed thru bus assembly 244 of the main breaker apparatus 225.

Electrical power distribution system 400 may include a second main breaker apparatus 425A, including a second enclosure 426A, and a second bus assembly 442A in the second enclosure 426A. The second bus assembly 442A includes a second feed thru bus assembly 444A (identical to feed thru bus assembly 244) including a plurality of feed thru bus bars, and the plurality of feed thru bus bars, and a second cross bus assembly 446A including a plurality of cross bus bars. Second main breaker apparatus 425A may include a second main circuit interface device 461A coupled between the second feed thru bus assembly 444A and the second cross bus assembly 446A. Electrical power distribution system 400 may include a second meter stack 406A abutting the second enclosure 426A. Electrical power distribution system 400 may optionally include even a third meter stack 406B abutting the main breaker apparatus 225, and even a fourth meter stack 406C abutting the second main breaker apparatus 425A.

Figure 5:
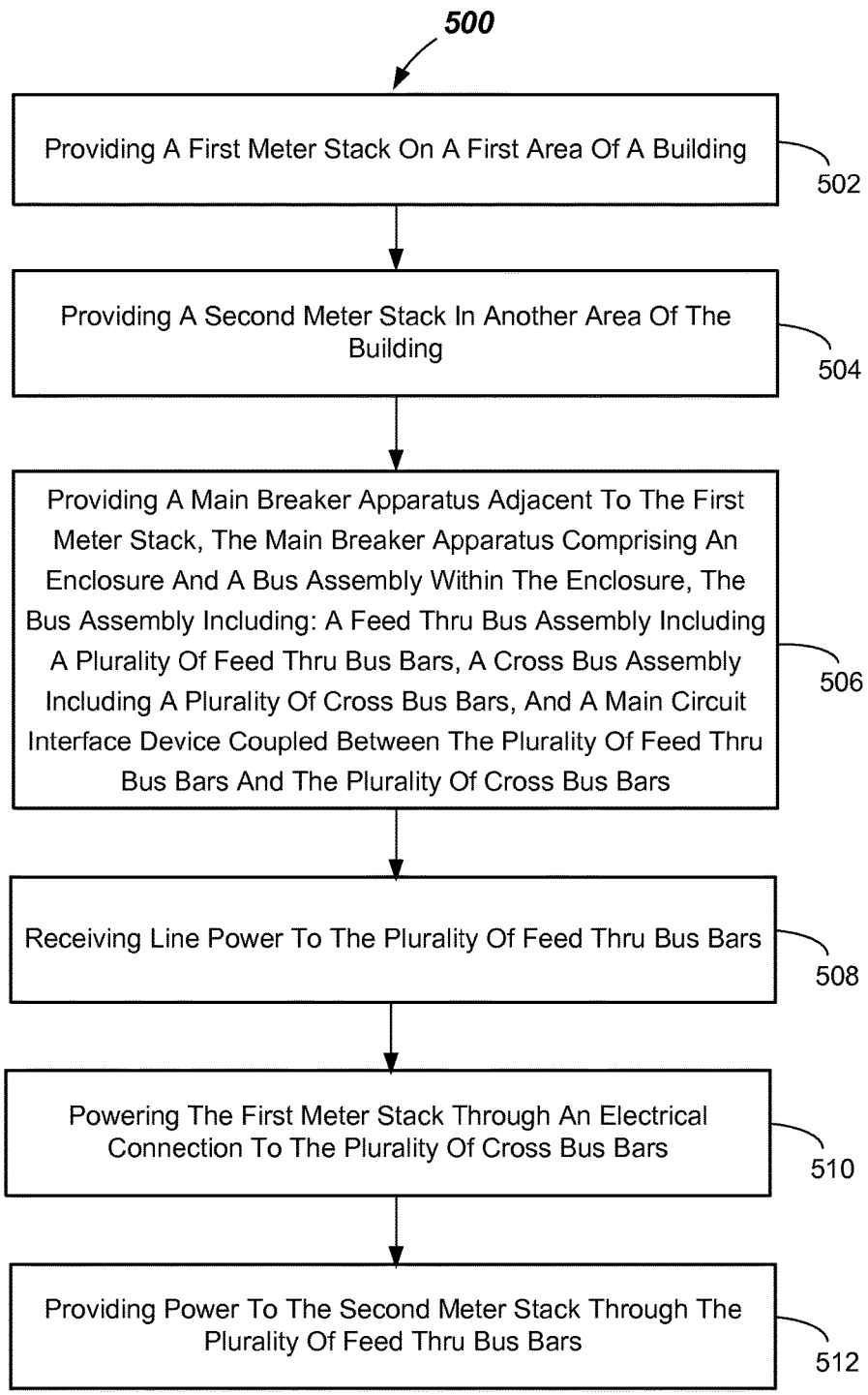
FIG. 5 illustrates a flowchart of a method of power distribution according to embodiments.

FIG. 5 illustrates a method of providing power to a multi-unit building, such as a multi-story residential or office building (e.g. apartments, condos, office suites, or the like), or such residential or office buildings having a large number of units on one level. The method 500, involves, in 502, providing a first meter stack (e.g., meter stack 406) in a first area of a building (e.g., a first floor or first area), and, in 504, providing a second meter stack (e.g., meter stack 406A) on another area of the building (e.g., a second floor or second area).

The method 500 involves, in 506, providing a main breaker apparatus (e.g., 225) adjacent to the first meter stack (e.g., first meter stack 406), the main breaker apparatus comprising an enclosure (e.g., enclosure 226) and a bus assembly (e.g., bus assembly 242) within the enclosure, the bus assembly including: a feed thru bus assembly (e.g., feed thru bus assembly 244) including a plurality of feed thru bus bars (e.g., feed thru bus bars 244A-244C, and 244N), a cross bus assembly (e.g., cross bus assembly 246) including a plurality of cross bus bars (e.g., cross bus bars 246A-246C, and 246N), and a main circuit interface device (e.g., main circuit interface device 261) coupled between the plurality of feed thru bus bars and the plurality of cross bus bars.

The method 500 includes, in 508, receiving line power (e.g., from a main service panel 402) to the plurality of feed thru bus bars (e.g., feed thru bus bars 244A-244C, and 244N), and, in 510, powering the first meter stack through an electrical connection to the plurality of cross bus bars (e.g., cross bus bars 246A-246C, and 246N), and, in 512, providing power to the second meter stack (e.g., second meter stack 406A) through the plurality of feed thru bus bars (e.g., feed thru bus bars 244A-244C, and 244N). The method 500 may also involve providing power to a third meter stack 406B, and even a fourth meter stack 406C.

It should be readily appreciated by those persons of ordinary skill in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular apparatus, systems and/or methods disclosed, but, to the contrary, the intention is to cover all modifications, equivalents, and alternatives falling within the scope of the invention.

What is claimed is:

1. A main breaker apparatus, comprising:
    an enclosure having a back side, a first side, a second side, a top side having one or more chimneys, and a bottom side; and
    a bus assembly in the enclosure, the bus assembly including:
        a feed thru bus assembly including a plurality of feed thru bus bars configured to receive line power at a first end and pass thru power at a second end,
        wherein the plurality of feed thru bus bars extending vertically from the bottom side to the top side of the enclosure along a length of the enclosure such that the plurality of feed thru bus bars are configured to receive the line power from a main service panel directly at the first end of the plurality of feed thru bus bars being proximate to the bottom side of the enclosure and pass through an electrical current to the second end of the plurality of feed thru bus bars through the plurality of feed thru bus bars, wherein the second end is proximate to the top side of the enclosure,
        wherein the feed thru bus assembly comprises:
        a first thru mounting bracket and a second thru mounting bracket,
            wherein the plurality of feed thru bus bars includes an A-phase feed thru bus bar, a B-phase feed thru bus bar, and a C-phase feed thru bus bar arranged in a side-by-side orientation between the first side of the enclosure and the second side of the enclosure, each extends from the bottom side of the enclosure to the top side of the enclosure, each being coupled to the first and second thru mounting brackets and each ends in a wire terminal;
        a cross bus assembly including a plurality of cross bus bars extending between the first side and the second side, the enclosure configured to allow electrical connection to the plurality of cross bus bars through an opening in at least one of the first side and the second side, and
        a main circuit interface device coupled between the plurality of feed thru bus bars and the plurality of cross bus bars,
        wherein the main circuit interface device having line side conductor and load side conductors such that the line side conductors directly connect with the plurality of feed thru bus bars on a phase by phase basis and the load side conductors directly connect with the plurality of cross bus bars on a phase by phase basis.

2. The main breaker apparatus of claim 1, wherein the top side of the enclosure includes a plurality of hub covers covering hub openings or a plurality of knockouts.

3. The main breaker apparatus of claim 1, wherein the first thru mounting bracket having one or more ventilation holes therein and the second thru mounting bracket having one or more ventilation holes therein.

4. The main breaker apparatus of claim 1, wherein the feed thru bus assembly comprises a first line side bracket coupled to an A-phase thru bus bar, a second line side bracket coupled to a B-phase thru bus bar, and third line side bracket coupled to a C-phase thru bus bar.

5. The main breaker apparatus of claim 1, comprising a polypropylene standoff located between a first support member and each of the plurality of feed thru bus bars, and between a second support member and each of the plurality of feed thru bus bars.

6. The main breaker apparatus of claim 1, wherein the feed thru bus assembly comprises a first line side bracket coupled to an A-phase feed thru bus bar, a second line side bracket coupled to a B-phase feed thru bus bar, and third line side bracket coupled to a C-phase feed thru bus bar.

7. The main breaker apparatus of claim 1, wherein the cross bus assembly comprises a first connector at the first side and a second connector at the second side, and the plurality of cross bus bars extending continuously between the first side and the second side.

8. The main breaker apparatus of claim 7, comprising: a first load side bracket coupled to an A-phase cross bus bar; a second load side bracket coupled to a B-phase cross bus bar; and a third load side bracket coupled to a C-phase cross bus bar.

9. The main breaker apparatus of claim 8, comprising a cross bus mounting bracket coupled to each of the first load side bracket, second load side bracket, and third load side bracket and to the back side.

10. The main breaker apparatus of claim 9, wherein the first load side bracket includes a first bracket portion coupled to the A-phase cross bus bar, a second bracket portion coupled to the first bracket portion, the second bracket portion comprising a U-shape and having a first leg and a second leg, a load side breaker connector on the second leg, and an insulating sleeve on the second bracket portion.

11. The main breaker apparatus of claim 9, wherein the second load side bracket includes a first bracket portion coupled to the B-phase cross bus bar, a second bracket portion coupled to the first bracket portion on one end, and a load side breaker connector coupled to the second bracket portion on a second end, and an insulating sleeve on the second bracket portion.

12. The main breaker apparatus of claim 9, wherein the third load side bracket includes a first bracket portion coupled to the C-phase cross bus bar, a second bracket portion coupled to the first bracket portion, the second bracket portion comprising a U-shape having a first leg and a second leg, a load side breaker connector on the second leg, and an insulating sleeve on the second bracket portion.

13. The main breaker apparatus of claim 1, comprising a neutral bracket connecting a neutral cross bus bar of the cross bus assembly to a neutral thru bus bar of the feed thru bus assembly.

14. The main breaker apparatus of claim 1, wherein the main circuit interface device comprises a circuit breaker.

15. The main breaker apparatus of claim 1,
wherein the first end of the plurality of feed thru bus bars includes a plurality of line connectors and the second end of the plurality of feed thru bus bars includes a plurality of load connectors such that the plurality of the line connectors and the plurality of load connectors are configured to enable an electrical connection of incoming and outgoing electrical wires to the plurality of feed thru bus bars, and
wherein at least one line connector of the plurality of line connectors and at least one load connector of the plurality of load connectors is attached to each feed thru bus bar of the plurality of feed thru bus bars.

16. The main breaker apparatus of claim 15,
wherein the plurality of feed thru bus bars are coupled to line side brackets such that the line side brackets couple to the plurality of feed thru bus bars on one end and include line side breaker mounts at another end such that the line side breaker mounts are configured to attach to a line side of the main circuit interface device, and
wherein the line side brackets provide an electrical connection between the plurality of feed thru bus bars and the line side of the main circuit interface device.

17. A main breaker apparatus, comprising:
an enclosure having a back side, a first side, a second side opposing the first side, a top side, and a bottom side; and
a bus assembly disposed in the enclosure, the bus assembly including:
a plurality of feed thru bus bars configured to receive line power at a first end and pass thru power at a second end,
wherein the first end of the plurality of feed thru bus bars includes a plurality of line connectors and the second end of the plurality of feed thru bus bars includes a plurality of load connectors such that the plurality of the line connectors and the plurality of load connectors are configured to enable an electrical connection of incoming and outgoing electrical wires to the plurality of feed thru bus bars,
wherein each feed thru bus bar of the plurality of feed thru bus bars having a width, and a thickness that is less than the width, the plurality of feed thru bus bars configured perpendicularly with respect to the top side and the bottom side, and further configured in a side-by-side spaced apart relation in a direction from the first side to the second side, such that a wider part of each feed thru bus bar faces toward the back side;
a plurality of cross bus bars configured perpendicularly between the first side and the second side, the plurality of cross bus bars configured to engage with a meter stack through at least one of the first side or the second side;
at least one line connector of the plurality of line connectors and at least one load connector of the plurality of load connectors attached to each feed thru bus bar of the plurality of feed thru bus bars;
a main circuit interface device coupled between the plurality of feed thru bus bars and the plurality of cross bus bars, wherein the main circuit interface device includes line side conductors and load side conductors such that the line side conductors directly connect with the plurality of feed thru bus bars; and
a first thru mounting bracket and a second thru mounting bracket,
wherein the plurality of feed thru bus bars includes an A-phase feed thru bus bar, a B-phase feed thru bus bar, and a C-phase feed thru bus bar arranged in a side-by-side orientation between the first side of the enclosure and the second side of the enclosure, each extends from the bottom side of the enclosure to the top side of the enclosure, each being coupled to the first and second thru mounting brackets and each ends in a wire terminal.

18. The main breaker apparatus of claim 17, wherein the top side comprises one or more chimneys.

19. The main breaker apparatus of claim 17, further comprising a mounting bracket coupled to a first one of the plurality of feed thru bus bars, wherein the mounting bracket includes ventilation holes.

* * * * *